Jan. 22, 1963  B. LUSTMAN ETAL  3,074,871
ALLOY COMPOSITION FOR NEUTRONIC REACTOR CONTROL RODS
Filed Oct. 8, 1957  3 Sheets-Sheet 3

INVENTORS
Benjamin Lustman, Ezehiel F. Losco,
Harold J. Snyder & Richard R. Eggleston
BY
Frederick Shaper
ATTORNEY

WITNESSES 3,074,871
ALLOY COMPOSITION FOR NEUTRONIC REACTOR CONTROL RODS
Benjamin Lustman, Pittsburgh, Ezekiel F. Losco, Whitehall Borough, Harold J. Snyder, Bethel Park, and Richard R. Eggleston, Whitehall Borough, Pa., assignors, by mesne assignments, to the United States of America as represented by the United States Atomic Energy Commission
Filed Oct. 8, 1957, Ser. No. 688,995
4 Claims. (Cl. 204—193.2)

This invention relates to alloy compositions suitable for use in the fabrication of control rods for neutronic reactors, to control rods fabricated from said alloy compositions, and to neutronic reactors embodying the control rods.

In neutronic reactors a neutron fissionable isotope, such, for example, as $U^{233}$, $U^{235}$, or $94^{239}$, or mixtures thereof, is subjected to fission by absorption of neutrons, and a self-sustaining reaction is established by the neutrons evolved by the fission. Neutronic reactors generally comprise bodies of compositions containing such fissionable material, for example, natural uranium closely associated with a neutron slowing material which slows the neutrons to thermal energies. Such a slowing material is referred to in the art as a moderator. Pressurized water, carbon, beryllium, and deuterium oxide are examples of suitable moderator materials for such use.

An effective method for regulating or controlling neutronic reactors is to move control rods of neutron absorbing material into and out of the neutronic reacting system. Also, a common method for terminating the reaction under emergency conditions is to move one or more neutron absorbing safety or "scram" control rods into the reactor. A control rod is moved slowly into and out of the neutronic reacting system to correct for small changes in the reactivity of the neutronic reactor only, while a safety or "scram" control rod must be moved into proper position with great speed.

In selecting metals and alloys suitable for use in the fabrication of control rods for neutronic reactors, several metallurgy, mechanics and physics design requirements must be carefully considered. The major requirements may be indicated generally as follows:

(1) High total neutron absorption cross section and minimum loss of physics worth when subjected to irradition for long periods of time.

(2) Metallurgical stability under neutron irradiation and freedom from harmful irradiation damage that will prevent proper functioning during reactor operation.

(3) Good resistance to corrosion when used in high temperature pressurized water.

(4) Substantial freedom from thermal distortion under non-uniform temperature conditions during reactor operation.

(5) Sufficient mechanical strength and ductility to withstand scramming loads during operation.

Additional important considerations include the availability of the metal or metals comprising the alloy, the ease of fabricating the metal into intricate shapes for control rods, and the cost of the metal.

Heretofore, hafnium has been the only known metal that substantially met most of the requirements for control rod material. Hafnium, however, is difficult to fabricate into desired shapes, and must be provided with a protective covering of another metal during forging or extrusion. Furthermore, the availability of hafnium is limited and it is extremely expensive.

It is desirable to have available in the art a material that will substantially meet all the above enumerated requirements.

The object of this invention is to provide an alloy composition suitable for use in fabricating control rods for use in neutronic reactors.

Another object of this invention is to provide a control rod that is suitable for use in neutronic reactors.

A further object of this invention is to provide in a neutronic reactor having means for producing neutrons located therein, a means for controlling the number of neutrons produced, said means comprising a specific alloy composition.

Other objects of the invention will, in part, be obvious and will, in part, appear hereinafter.

For a better understanding of the nature and objects of the invention reference should be had to the following detailed description and drawing, in which.

Figure 1:
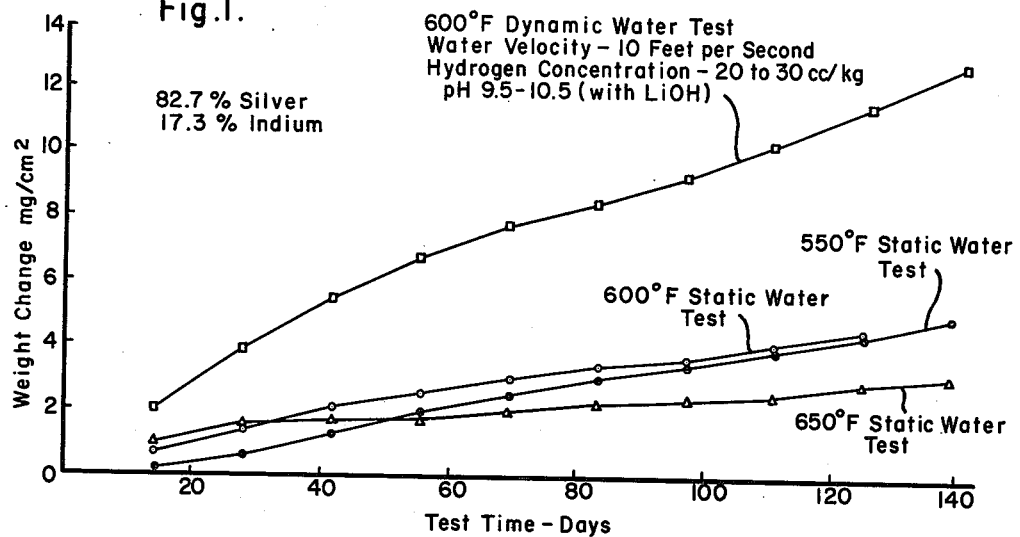
FIGURES 1, 2, 3, 4 and 5 are graphs plotting weight change against time for several indicated alloy compositions and under certain specified conditions.
Figure 2:
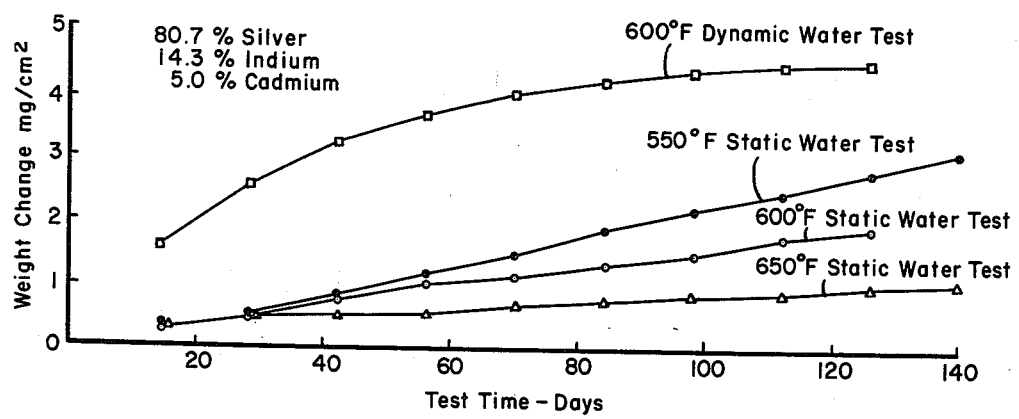
Figure 3:
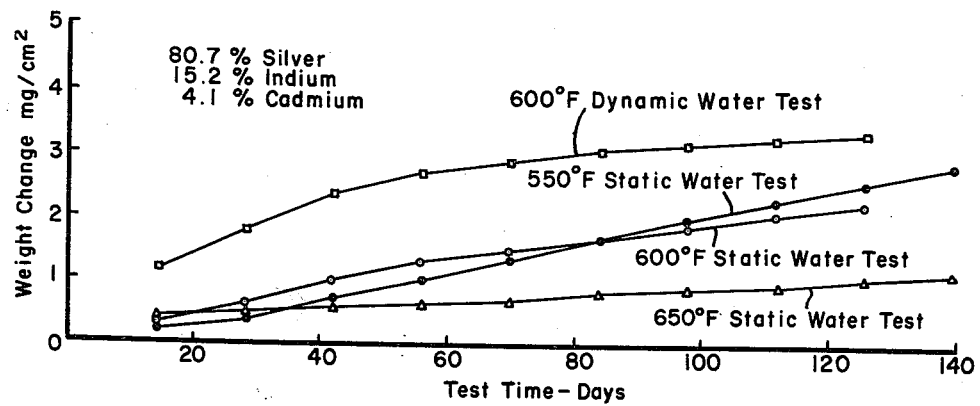
Figure 4:
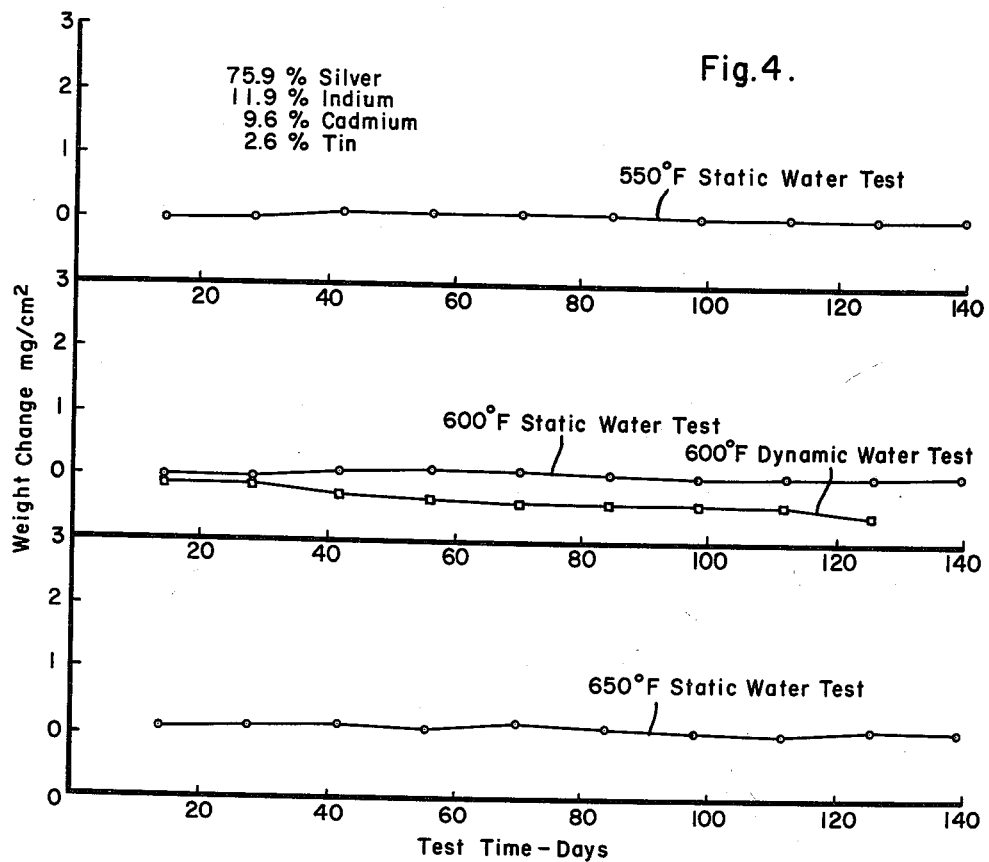
Figure 5:
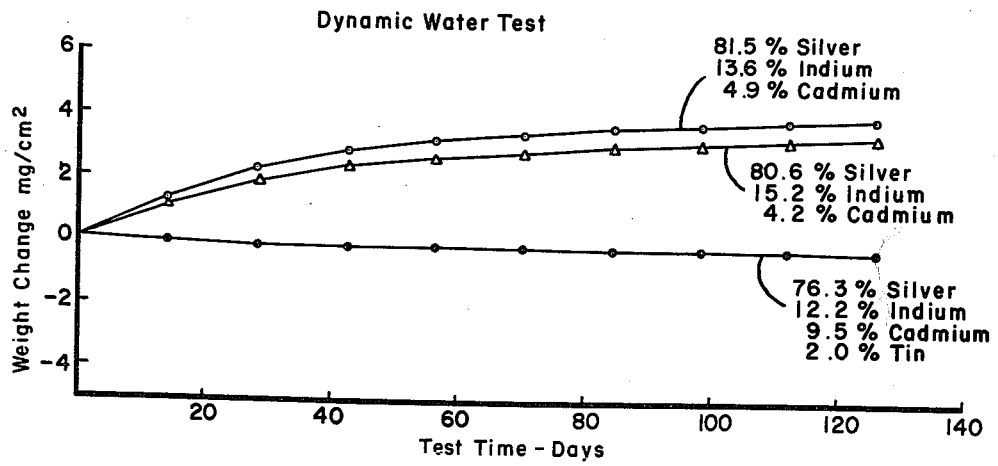

In accordance with this invention certain single phase silver base alloys have been prepared and found to be highly satisfactory for the fabrication of control rods for neutronic reactors.

More specifically, binary alloys of silver and indium; ternary alloys of silver, indium and cadmium; silver, indium and tin; and quaternary alloys of silver, indium, cadmium and tin, all of which are solid solution, single phase type, have proven to be satisfactory. Satisfactory alloy compositions will comprise by weight, from 65% to 85% of silver, from 2% to 20% of indium, from 0 to 10% of cadmium and from 0 to 5% of tin. Small amounts of aluminum, up to about 1.5%, may be added to the alloys to improve corrosion resistance and strength.

The binary alloys of silver and indium will comprise, by weight, from about 80% to 85% of silver and from 15% to 20% of indium. An alloy of this composition has high epithermal and moderately high thermal neutron absorption properties since silver and indium complement one another with respect to the location of their resonance absorption peaks which do not overlap. The amount of indium employed is restricted owing to its limited solubility in silver. Increasing the amount of indium beyond the limits set forth herein will result in an undesirable phase transformation on heating and cooling with attendant dimensional instability.

It is highly desirable to maintain the alloys of this invention in the solid solution range so that the alloy compositions will retain a single phase crystal structure during the life of the neutronic reactor, thereby insuring metallurgical stability of the alloy. Phase changes are usually accompanied by dimensional changes and any substantial dimensional changes are undesirable in control rods for neutronic reactors owing to the close tolerances required between the control rod and the reactor elements.

Various alloy compositions of this invention that will retain a single phase crystal structure and hence insure metallurgical stability can be determined by employing the following equation:

$$X + 2Y + 3Z + 3W + 4V = 1.4 \text{ and less}$$

where the symbols X, Y, Z, W and V represent the atom fractions of the elements silver, cadmium, indium, aluminum and tin, respectively, where silver is within 65% to 85% and the indium from 2% to 20%, cadmium does not exceed 10%, tin does not exceed 5% and aluminum does not exceed 1.5%. In employing the above equation, it is preferred that the result equal 1.4. However, owing to various metallurgical problems and the like involved in preparing alloy compositions the result will sometimes be about 1.3. Such latter alloy compositions are satisfactory and can be employed in this invention.

As an example of the application of the above equation, in a ternary silver-indium-cadmium alloy, the compositions that will result in a single phase solid solution can be readily calculated from the equation when the concentration of one of the constituents is set before hand.

If the aluminum additions are made, it will replace indium on an equal atom fraction basis, or it will replace cadmium on the basis of 1.5 atoms of cadmium per atom of aluminum or it will replace silver on the basis of three atoms of silver for each atom of aluminum.

During irradiation of silver-indium-cadmium alloys, silver will transmute to cadmium, indium to tin and cadmium will remain as cadmium, since only an isotopic change takes place in cadmium. The products of transmutation all have lower neutron absorption cross-sections and physics worth will decrease with time. Also, the composition of the alloy will change with irradiation and it is necessary to consider not only the initial alloy composition but also the alloy composition after exposure to neutron irradiation to insure that a single phase will remain over a reasonable period of use of the alloy control rods in a reactor.

It has been found that by employing the above equation, single phase alloy compositions can be prepared which will retain a single phase when subjected to irradiation regardless of changes in composition due to such irradiation.

A considerable number of alloy compositions of the present invention were prepared and investigated as to their suitability for control rod materials. Any conventional method of preparation can be employed in producing the alloy compositions of this invention. The alloy compositions can be easily prepared by placing in a graphite melting crucible the desired proportions of the alloying components. The components are melted by means of induction heating apparatus. To prevent oxidation of the molten alloy components, a protective cover of calcined coke pellets is preferably placed on the surface of the melt. Ingots of the alloy composition can be conveniently cast by pouring the molten alloy composition from melting furnace to ladle to mold, in the conventional manner, or by pouring directly from the bottom of the graphite melting crucible into suitable molds. If desired, the bottom turns of an induction heating coil may be employed for hot-top heating of the cast ingot to prevent extensive piping in the ingot. Ingots of the alloy composition of this invention, weighing from 5 to 300 pounds have been cast by both methods. If desired, the ingots may be homogenized at a temperature of about 1100° F. for about 24 hours in an atmosphere of argon.

The following table lists several alloy compositions so prepared. The amount of alloying components was determined by taking samples from the top and bottom of the ingots prepared and the amount of each element listed in the table represents the average of each present in the two samples. Therefore the total may not equal exactly 100%.

TABLE I

| Alloy No. | Silver | Indium | Cadmium | Aluminum | Tin |
|---|---|---|---|---|---|
| 1 | 85.3 | 14.8 | | | |
| 2 | 82.7 | 17.3 | | | |
| 3 | 80.0 | 20.3 | | | |
| 4 | 79.7 | 19.6 | | 0.56 | |
| 5 | 74.6 | 24.6 | | 0.53 | |
| 6 | 76.7 | 22.0 | | 1.16 | |
| 7 | 81.6 | 13.6 | 4.9 | | |
| 8 | 75.3 | 9.8 | 14.8 | | |
| 9 | 72.0 | 7.7 | 20.1 | | |
| 10 | 68.0 | 2.6 | 29.5 | | |
| 11 | 69.6 | 19.8 | 9.8 | 0.53 | |
| 12 | 74.6 | 19.8 | 4.9 | 0.56 | |
| 13 | 71.9 | 18.1 | 10.0 | 1.16 | |
| 14 | 78.7 | 13.3 | 4.85 | | 2.97 |
| 15 | 76.3 | 12.1 | 9.4 | | 2.00 |
| 16 | 71.7 | 7.2 | 19.2 | | 1.80 |
| 17 | 63.5 | 2.4 | 33.1 | | 0.50 |

The corrosion resistance properties of various alloy compositions of the invention were investigated under various conditions.

Static water tests were performed in stainless steel autoclaves at temperatures of 500° F., 550° F., 600° F. and 650° F. using deionized water which was degassed during the heat-up period and replaced every 7 or 14 days. The pH of the water was maintained in the range of from 6.5 to 7.5 and the initial resistivity of the water was 500,000 ohms-cms. Test data obtained at 600° F. are particularly pertinent because this temperature is somewhat above the temperature to which control rods are usually subjected in pressurized water reactors, the operating temperature of pressurized water reactors usually being from about 525° F. to 550° F.

Circulating water autoclave tests at 550° F. and 650° F. using degassed, hydrogenated and oxygenated water at pH levels of 8.5 to 9.5 and from 9.5 to 10.5 were conducted. In these tests additions of ammonium hydroxide were made to the feed water to maintain the lower level of pH and lithium hydroxide was added for the higher pH level. The water was circulated in the autoclave loop at a flow rate of about one gallon per hour. Facilities were provided for inlet and outlet autoclave water sampling and daily measurements of pH and gas analysis. High pH and hydrogenated water are of interest in pressurized water reactors since the reactor is designed to operate with coolant water having a pH of from 9.5 to 10.5 and with hydrogen concentration of from 25 to 30 ccs. per kilogram. Ammonium hydroxide and oxygen-bearing water are of interest because of the possibility of contamination of the water by these constituents for short periods of time under emergency reactor operating conditions.

Dynamic loop corrosion tests at 600° F. were also conducted using hydrogenated water at pH levels of from 6.5 to 7.5 and from 9.5 to 10.5. Water velocity was maintained at about 10 feet per second. This test, except for the absence of neutron exposure, simulated actual pressurized water reactor operating conditions.

Data obtained from these tests are indicated in the FIGURES 1, 2, 3, 4 and 5 of the drawing. Alloy compositions and the test employed are indicated. These curves indicate that the alloy compositions of this invention show good corrosion resistance and fully meet the requirements for use in control rods for neutronic reactors.

Physics worth tests were conducted on small samples (2 inches x 2 inches x 225 mils) in a warm temperature operated experimental critical reactor facility designed to simulate the neutron flux spectrum expected in full scale reactor operation. Physics worth is the measure of the ability of a material to absorb neutrons. The reactivity of each sample was calculated and the values are herein reported as the physics worth relative to the physics worth of a hafnium sample of the same size, which served as a standard of comparison. The presence of small amounts of aluminum in the alloy composition detracts from the physics worth of the alloy because of its low neutron absorption cross-section; however, its removal from the alloy composition would permit only a small cadmium or silver increase which would not appreciably change the results. Physics worth values exceeding that of hafnium are obtained by the addition of cadmium to an alloy composition comprising 80% by weight of silver and 20% by weight of indium. However, increasing the cadmium content beyond about 5% by weight does not appreciably improve the initial physics worth of the alloy composition.

Data obtained from the physics worth tests are shown in the following table. Relative worth is based on the physics worth of hafnium which is taken as 1.

TABLE II

| Composition, weight percent | | | | | Relative worth |
|---|---|---|---|---|---|
| Ag | In | Cd | Al | Sn | |
| 78.5 | 18.6 |  | 0.72 |  | 0.94 |
| 76.7 | 22.0 |  | 1.16 |  | 0.96 |
| 79.7 | 19.6 |  | 0.56 |  | 0.99 |
| 74.6 | 24.6 |  | 0.53 |  | 1.01 |
| 74.6 | 19.8 | 4.9 | 0.56 |  | 1.03 |
| 69.6 | 19.8 | 9.8 | 0.53 |  | 1.03 |
| 70.9 | 18.1 | 10.0 | 1.16 |  | 1.02 |
| 64.8 | 19.5 | 15.2 | 0.53 |  | 1.03 |
| 81.6 | 13.6 | 4.9 |  |  | 0.99 |
| 77.2 | 11.1 | 0.79 |  | 10.8 | 0.94 |
| 82.7 | 17.3 |  |  |  | 0.94 |
| 75.6 | 12.9 |  |  | 11.7 | 0.89 |

The minimum yield strength (at 0.2% offset) required for control rods used in one type of industrial power reactor to resist scramming loads has been calculated to be about 4000 p.s.i. at 600° F. A factor of safety of 2.5 is applied to this and a value of the order of 10,000 p.s.i., combined with an area of reduction of about 30% is considered desirable. The alloy compositions of this invention have a 0.2% yield strength of from 11,000 to 12,000 p.s.i. and higher at 600° F. The tensile properties of several alloy compositions were determined at room temperature and at 600° F. The data obtained from these tests are set forth in the following Table III. All test samples were 2 inches x .5 inch x .225 inch and were cold rolled and annealed for one hour at 500° C. except the last two alloys listed which were annealed for one hour at 600° C.

TABLE III

| Composition, percent by weight | | | | | Test temp., °F. | Strength, p.s.i. 0.2% yield | Ultimate strength, p.s.i. | Reduction of area, percent | Percent elongation in 2 in. |
|---|---|---|---|---|---|---|---|---|---|
| Ag | In | Cd | Al | Sn | | | | | |
| 81.6 | 13.6 | 4.9 |  |  | 70 | 10,500 | 42,800 | 62 | 67 |
|  |  |  |  |  | 600 | 9,600 | 17,600 | 50 | 34 |
| 78.7 | 13.3 | 4.9 |  | 2.97 | 70 | 21,900 | 51,000 | 35 | 41 |
|  |  |  |  |  | 600 | 18,000 | 19,500 | 59 | 17 |
| 76.3 | 12.1 | 9.4 |  | 2.00 | 70 | 22,800 | 53,200 | 45 | 50 |
|  |  |  |  |  | 600 | 15,700 | 17,600 | 65 | 35 |
| 74.6 | 19.8 | 4.9 | 0.56 |  | 70 | 25,200 | 42,800 | 30 | 32 |
|  |  |  |  |  | 600 | 17,100 | 17,600 | 2 | 3 |
| 69.6 | 19.8 | 9.8 | 0.53 |  | 70 | 19,200 | 36,300 | 19 | 15 |
|  |  |  |  |  | 600 | 13,000 | 13,700 | 0 | 0 |

It has been determined that the preferred alloy composition for use in fabricating control rods is an alloy comprising essentially, by weight, about 80% of silver, 15% of indium and 5% of cadmium.

Three ingots about 7 inches in diameter and weighing about 200 pounds each were produced by air induction melting 80% by weight of silver, 15% by weight of indium and 5% by weight of cadmium in graphite crucibles and pouring into graphite molds. A layer of calcined coke was placed over the melt to prevent oxidation of the alloy components during melting. The ingots were homogenized for about 24 hours at 1100° F. The ingots were then press forged at a temperature of about 1100° F. to a diameter of from about 5¾ inches to 6 inches, and then machined to a diameter of about 5.45 inches. Four billets from these ingots were extruded at various temperatures into cruciform-shaped control rods. The cruciform cross-sectional span was about 3¾ inches and the blade thickness was about 0.375 inch. Excellent surface condition was noted on all extrusions.

The following table shows the chemical analysis, extrusion conditions and annealing treatment applied to the extrusions.

TABLE IV

| Extrusion No. | Analyzed percent by weight composition | | | Extrusion conditions | | Annealing conditions | |
|---|---|---|---|---|---|---|---|
| | Ag | In | Cd | Preheat time, minutes | Temperature, °C. | Time, minutes | Temperature, °C. |
| 1 | 79.62 | 15.6 | 4.78 | 40 | 593 | 60 | 500 |
| 2 | 79.40 | 15.0 | 5.6 | 115 | 593 | 30 | 400 |
| 3 | 79.25 | 15.1 | 5.6 | 60 | 438 | 60 | 400 |
| 4 | 80.0 | 14.7 | 5.4 | 60 | 482 | 60 | 400 |

The room temperature and 600° F. tensile properties of the four control rod extrusions are listed in the following table.

TABLE V

*Tensile Properties of Control Rod Extrusions*

| Ext. No. | Condition | Test temp., °F. | 0.2% Y.S., p.s.i. | Ult. str., p.s.i. | Red. of area, percent | Elong. in 2", percent | Hardness, DPH | ASTM grain size |
|---|---|---|---|---|---|---|---|---|
| 1 | As extruded | 70 | 10,800 | 43,750 | 52 | 58 | 84.1 | 8 |
|  | Preheated 40 min. at 593° C | 600 | 9,600 | 18,800 | 56 | 42 |  |  |
|  | Extruded | 70 | 7,700 | 38,600 | 60 | 61 | 67.8 | 1-3 |
|  | Plus 1 hr. at 500° C | 600 | 7,730 | 17,100 | 49 | 34 |  |  |
| 2 | As extruded | 70 | 15,600 | 45,600 | 58 | 53 | 70.0 | 4-6 |
|  | Preheated 115 min. at 593° C | 600 | 13,600 | 15,600 | 74 | 61 |  |  |
|  | Extruded | 70 | 11,800 | 44,200 | 46 | 52 | 67.0 | 4-6 |
|  | Plus 1 hr. at 400° C | 600 | 11,400 | 16,800 | 78 | 43 |  |  |
| 3 | As extruded | 70 | 14,000 | 46,000 | 56 | 52 | 95.8 | 8 |
|  | 60 min. at 438° C | 600 | 12,200 | 15,200 | 85 | 39 |  |  |
|  | Extruded | 70 | 13,900 | 46,600 | 60 | 57 | 81.9 | 6-8 |
|  | Plus 1 hr. at 400° C | 600 | 12,600 | 14,200 | 74 | 40 |  |  |
| 4 | As extruded | 70 | 15,200 | 45,000 | 52 | 44 | 99.3 | 8 |
|  | 60 min. at 482° C | 600 | 11,100 | 12,000 | 75 | 96 |  |  |
|  | Extruded | 70 | 11,000 | 42,900 | 55 | 51 | 78.5 | 4-8 |
|  | Plus 1 hr. at 400° C | 600 | 11,000 | 16,100 | 71 | 50 |  |  |

The results listed in the above table are presented for as-extruded and annealed rods together with grain size and hardness for these conditions. It will be noted that yield strength is reduced by annealing and that the reduction of area is appreciable for material annealed at 500° C. This is consistent with the reduction in hardness and grain size observed with the high temperature anneal. All extrusions which were annealed for ½ to 1 hour at 400° C. have yield strengths in excess of 10,000 p.s.i. which is adequate for industrial reactors.

Additional physical properties of the 80% silver—15% indium—5% cadmium alloy composition are set forth in the following table.

TABLE VI

*Physical Properties of Ag-15 w/o In-5 w/o Cd Alloys*

Thermal Conductivity

| Temp., °C. | Cal./sec.-cm.-°C. | B.t.u./hr.-ft.-°F. |
|---|---|---|
| [1] 0 | 0.131 | 31.7 |
| [1] 25 | 0.135 | 32.7 |
| 50 | 0.141 | 34.1 |
| 100 | 0.150 | 36.3 |
| 200 | 0.168 | 40.7 |
| 300 | 0.183 | 44.3 |
| 400 | 0.196 | 47.4 |
| 500 | 0.207 | 50.1 |
| 600 | 0.216 | 52.3 |

[1] Extrapolated.

Dynamic Modulus of Elasticity

| Temp., °C. | Lb./in.$^2$ × 10$^6$ |
|---|---|
| 25 | 11.52 |
| 100 | 11.13 |
| 200 | 10.62 |
| 300 | 9.86 |
| [1] 316 | 9.68 |

[1] 600° F.

Linear Coefficient of Thermal Expansion

25–500° C., 22.5×10$^{-6}$/° C.

Density

25° C., 10.17 g./cm.$^3$.

Melting Point

775–825° C. (approximate)

Four tensile samples of an alloy composition of this invention comprising 79.6% silver, 19.9% indium and 0.5% aluminum, and four tensile samples of an alloy comprising 80% silver, 15% indium and 5% cadmium were prepared. All eight samples were placed between Zircaloy-2 half cylinders and the cylinders were sealed by welding to encase the samples. The encased tensile samples were irradiated in various lattice and reflector positions in a test reactor to an unperturbed exposure of 1.4×10$^{21}$ neutrons/cm.$^2$-sec. (thermal neutrons) and 6.4×10$^{19}$ neutrons/cm.2-sec. (fast neutrons).

After irradiation the samples showed no dimensional changes or changes in density, thereby indicating that the alloy compositions are dimensionally stable when subjected to neutron irradiation. Further, there were no changes in the metallography of the samples. The single phase 80% silver—15% indium—5% cadmium alloy remained single phase after irradiation. The two phase 79.6% silver—19.9% indium—0.5% aluminum alloy remained two phase after irradiation. This is important since it indicates that the alloys of this invention can have up to about 10% of a second phase present without destroying their usefulness as control rod materials. It also indicates that exposures in excess of 1.4×10$^{21}$ neutrons/cm.$^2$-sec. are possible with the 80% silver—15% indium—5% cadmium alloy.

Corrosion tests were conducted on the irradiated samples and the tests in 650° F. static water showed the same corrosion resistance as samples that were not irradiated.

The table below lists tensile test results for several of the irradiated tensile test samples and several samples that had not been irradiated. The test results indicate an increase in yield strength in the irradiated samples.

TABLE VII

| Alloy composition, percent by weight | Exposure nvt equals neutron/cm.$^2$=sec. | 0.2% yield strength, p.s.i. | Ultimate strength, p.s.i. | Percent elongation in 2 inches |
|---|---|---|---|---|
| 79.6% Ag, 19.9% In, 0.5% Al | Not irradiated | 10,100 | 49,800 | 50 |
| 79.6% Ag, 19.9% In, 0.5% Al | do | 21,400 | 49,650 | |
| 79.6% Ag, 19.9% In, 0.5% Al | do | 19,300 | 49,750 | 50 |
| 79.6% Ag, 19.9% In, 0.5% Al | 8.7×10$^{20}$ nvt, 2.7×10$^{19}$ nvt | 26,500 | 51,600 | 39 |
| 79.6% Ag, 19.9% In, 0.5% Al | 8.8×10$^{20}$ nvt, 6.4×10$^{19}$ nvt | | 50,900 | |
| 79.6% Ag, 19.9% In, 0.5% Al | 2.3×10$^{20}$ nvt, 2.0×10$^{19}$ nvt | 32,200 | 50,500 | 45 |
| 80% Ag, 15% In, 5% Cd | Not irradiated | 8,240 | 37,200 | |
| 80% Ag, 15% In, 5% Cd | do | 8,240 | 39,400 | 52 |
| 80% Ag, 15% In, 5% Cd | do | 8,720 | 38,760 | 50 |
| 80% Ag, 15% In, 5% Cd | 14.4×10$^{20}$ nvt, 7.1×10$^{19}$ nvt | 13,650 | 41,900 | 52 |
| 80% Ag, 15% In, 5% Cd | 9.9×10$^{20}$ nvt, 3.7×10$^{19}$ nvt | 21,400 | 41,600 | 44 |
| 80% Ag, 15% In, 5% Cd | 3.3×10$^{20}$ nvt, 2.7×10$^{19}$ nvt | 27,900 | 41,400 | 44 |

Figure 6:
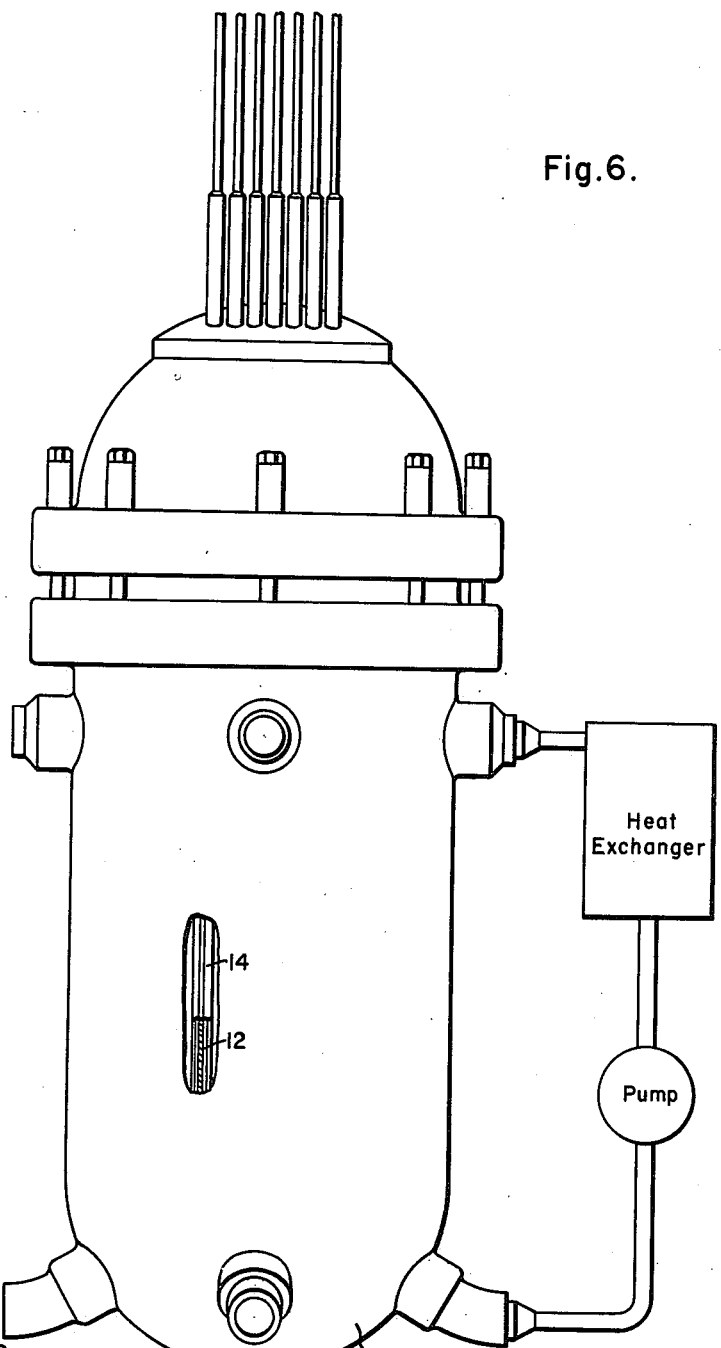
FIG. 6 is a view in elevation of a neutronic reactor with a portion thereof cut away.

Referring to FIG. 6 of the drawing there is shown a neutronic reactor 10 with a portion thereof cut away to show a control rod 12 positioned between fuel element 14. The reactor shown is a pressurized water reactor which employs water under a pressure of several thousand p.s.i. as a moderator. The temperature to which the control rod 12 will be subjected during use will be of the order of from about 525° F. to 550° F.; however, there may be areas in the reactor that may reach as high at 630° F., such, for example, as occur near hot spots on the fuel elements. The alloys of the present invention are especially well suited for use as the control rod 12. However the alloys are suitable for use in other reactors. For a detailed description of the components that comprise a pressurized water reactor and the manner of its operation, reference is made to the Westinghouse Engineer, vol. 17, No. 5, page 131, September 1957.

It will be understood that the description and drawings are exemplary and not in limitation of the invention.

We claim as our invention:

1. In a neutronic reactor, means for producing neutrons located within the reactor and means for controlling the number of neutrons produced thereby, said means for controlling the number of neutrons produced comprising a member of an alloy consisting essentially of, by weight, from 65% to 85% of silver, from 2% to 20% of indium, up to 10% of cadmium, up to 5% of tin, and up to 1.5% of aluminum, the amount of each element employed in the preparation of the alloy being determined by the equation $X+2Y+3Z+3W+4V=1.4$ and less, where X, Y, Z, W and V represent the atom fractions of the elements silver, cadmium, indium, aluminum and tin respectively.

2. In a neutronic reactor, means for producing fast neutrons located in said reactor, a moderator in said reactor comprising a compound selected from the group consisting of water and deuterium oxide, and neutron absorbing means for controlling the number of neutrons produced, said absorbing means comprising an elongated wrought member comprising an alloy consisting essentially of, by weight, from 65% to 85% of silver, from 2% to 20% of indum, up to 10% of cadmium, up to 5% of tin, and 0% to 1.5% of aluminum, the amount of each element employed in the preparation of the alloy being determined by the equation $X+2Y+3Z+3W+4V=1.4$ and less, where X, Y, Z, W and V represent the atom fractions of the elements silver, cadmium, indium, aluminum and tin respectively.

3. A control rod member for use in neutronic reactors comprising an alloy consisting essentially of, by weight, from 65% to 85% of silver, from 2% to 20% of indium, up to 10% of cadmium, 0% to 5% of tin, and up to 1.5% of aluminum, the amount of each element employed in the preparation of the alloy being determined by the equation $X+2Y+3Z+3W+4V=1.4$ and less, where X, Y, Z, W and V represent the atom fractions of the elements silver, cadmium, indium, aluminum and tin respectively.

4. An alloy suitable for use in control rods for neutronic reactors consisting essentially of, by weight, from 65% to 85% of silver, from 2% to 20% of indium, up to 10% of cadmium, up to 5% of tin, and up to 1.5% of aluminum, the amount of each element employed in the preparation of the alloy being determined by the equation $X+2Y+3Z+3W+4V=1.4$ and less, where X, Y, Z, W and V represent the atom fractions of the elements silver, cadmium, indium, aluminum and tin respectively.

References Cited in the file of this patent
UNITED STATES PATENTS 2,714,577    Fermi et al. _____ Aug. 2, 1955

OTHER REFERENCES

Sterner: Deutsche Goldschmiede Zeitung, 1938, No. 22, p. 3, "Indium Alloys."

Glasstone: "Elements of Nuclear Reactor Theory," 2nd printing, 1954, page 58.

Reactor Handbook, vol. 3, "Materials," publ. by AEC 1955, page 510.

Coen et al.: YAEC-35, Westinghouse Electric Corp. Progress Report, dated July 30, 1957, pages 43–45.